Nov. 6, 1934.  S. SAITO  1,979,906
BRAKE APPARATUS FOR A WHEEL
Filed Dec. 9, 1932
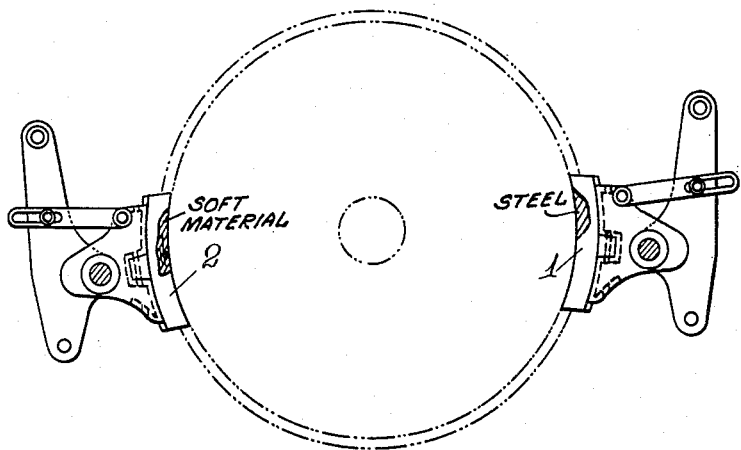
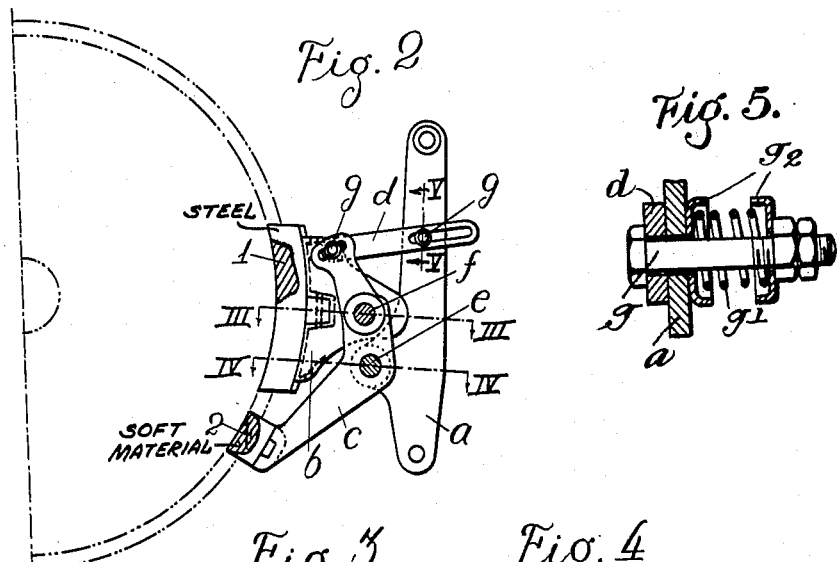
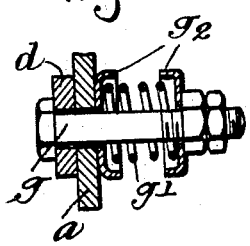
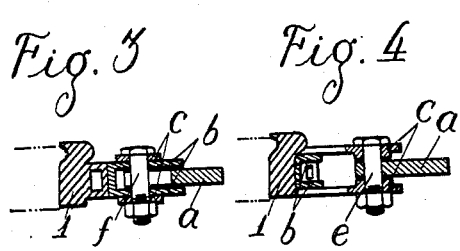

Patented Nov. 6, 1934

1,979,906

UNITED STATES PATENT OFFICE 1,979,906

BRAKE APPARATUS FOR A WHEEL

Seizo Saito, Toyonaka-Cho, Japan, assignor to Kabushiki Kaisha Sumitomo Seikosho, Konohana-ku, Osaka, Japan, a corporation of Japan Application December 9, 1932, Serial No. 646,559
In Japan July 25, 1932

5 Claims. (Cl. 188—33)

This invention relates to improvements in a brake apparatus for a wheel, and especially to the construction of brake shoes.

The brake shoes heretofore used generally consist of two small blocks of cast iron mounted on a wheel at the opposite sides thereof, and a large part of the brake shoes wears off within a comparatively short period of time so that it is necessary to replace them frequently. The same thing holds true relative to the shoes made of steel.

As the result of the inventor's prolonged experiment regarding the relative wear between three different materials, it has been discovered that the wear of the shoes is greatly reduced when a steel shoe is used concurrently with another shoe made of solid and soft material such as wood, asbestos-cloth, hard rubber or the like against the tyre as in the case of ordinary shoes. It has also been ascertained that the resistance of the shoes against wear is greatly increased if the contacting area of the two shoes in use and the pressure imparted to them are different in a proper proportion.

However, the best result was obtained, according to the inventor's experiment, when a shoe made of carbon steel containing carbon from 0.5 to 0.8% or alloy steel such as chromium steel and tungsten steel was employed on one side, and a soft shoe made of either wood, asbestos-cloth, hard rubber or the like was employed on the other side.

The soft materials here named are to be understood that they are softer than steel, the material used for the steel shoe.

If the contacting area of the soft shoe and the pressure imparted to it are smaller in degree than the area of the steel shoe and the pressure imparted to it, the wear of the shoes as a whole can be greatly lessened.

To carry out this invention there are several effective ways of mounting the shoes: A carbon steel or alloy steel shoe on the one side and a shoe of either wood, asbestos-cloth, hard rubber or the like materials on the other side of a wheel may be mounted, and the contacting area and the pressure of the shoes may be equal or otherwise. Two shoes made of different materials as above mentioned and put in adjacent position, may be mounted on one side alone or on both sides of a wheel at an opposing position.

Two typical examples of the brake apparatus according to the invention are shown in the attached drawing.

Referring to the attached drawing, Fig. 1 is a front elevation of a brake apparatus, Fig. 2 shows the same view with some modifications and Figs. 3 and 4 indicate sectional plan views of Fig. 2 on the lines III—III and IV—IV, respectively.

Figure 5 shows a sectional view of the spring washer on the section line V—V of Figure 2 on an enlarged scale.

In the drawing, 1 is a shoe made of steel and 2 is another one made of soft material. In Fig. 1, the shoes are held by holders of ordinary type. In Fig. 2, the steel shoe is held by a holder $b$ and the soft shoe is held by a holder $c$. These holders are pivotally jointed with a pin $f$, and the holder $c$ and a brake lever $a$, are connected with a pin $e$.

When the brake lever is operated in a known manner, the braking force is transmitted from $a$ to $c$ through the pin $e$, and a part of this force is applied to the shoe 1 through the pin $f$ while the remaining force is applied to the other shoe 2 so as to brake the wheel.

In this apparatus, if the relative positions of the pin $e$ and $f$ are properly determined, the ratio of the two forces that works on the two holders may vary to a large extent with the result that the force applied to 2 may be made a fraction of that applied to 1.

The function of a small length $d$ is to have the shoes resume their proper positions clear the wheel when the braking force is removed, and the frictional force at the spring washer $g$ at each end of the length $d$ keeps the holders $b$ and $c$ in proper positions relative to the lever $a$. The grooves on the lever $d$ and the holder $c$, are provided for adjusting the relative positions of these members. As shown in Figure 5 the spring for the washer $g$ is shown at $g_1$ and the washers at $g_2$.

An example of the experiments made by the above mentioned apparatus may be stated as follows: If the contacting area of a steel shoe is three times as large and the pressure imparted to it is eight times as large as that of soft shoe, a very good result is obtained.

Since malleable cast iron possesses similar properties to steel, a steel shoe can be replaced by a malleable cast iron shoe.

What I claim is:

1. A brake apparatus for a wheel which comprises a pair of shoes made respectively of steel and of soft material.

2. A brake apparatus for a wheel which comprises a pair of shoes made respectively of steel and of soft material put in adjacent position, and mounted on the same side of a wheel.

3. A brake apparatus for a wheel which comprises a pair of shoes made respectively of steel and of solid and soft material having different contacting areas.

4. A brake apparatus for a wheel which comprises a pair of shoes made respectively of steel and of solid and soft material, and a means to impart braking pressure dividedly to each shoe.

5. A brake apparatus for a wheel which comprises a pair of shoes made respectively of steel and of solid and soft material, having different contacting area, and a means to impart braking pressure dividedly to each shoe.

SEIZO SAITO.